United States Patent
Zhang et al.

(10) Patent No.: US 10,554,116 B2
(45) Date of Patent: Feb. 4, 2020

(54) PULSE WIDTH MODULATION UPSHIFT AT PARTIAL LOAD TO IMPROVE TOTAL HARMONIC CANCELLATION PERFORMANCE FOR CHILLER APPLICATIONS

(71) Applicant: Carrier Corporation, Palm Beach Gardens, FL (US)

(72) Inventors: Da Zhang, Middlebury, CT (US); Bassel Al-Annouf, Farmington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/182,792

(22) Filed: Nov. 7, 2018

(65) Prior Publication Data

US 2019/0140535 A1 May 9, 2019

Related U.S. Application Data

(60) Provisional application No. 62/583,213, filed on Nov. 8, 2017.

(51) Int. Cl.
*H02M 1/12* (2006.01)
*F25B 49/02* (2006.01)

(52) U.S. Cl.
CPC ............ *H02M 1/12* (2013.01); *F25B 49/025* (2013.01); *F25B 2600/021* (2013.01); *F25B 2600/024* (2013.01)

(58) Field of Classification Search
CPC . H02M 1/12; H02J 3/01; H02J 3/1842; F25B 49/025; F25B 2600/021; F25B 2600/024
See application file for complete search history.

(56) References Cited

U.S. PATENT DOCUMENTS 5,001,619 A  3/1991 Nakajima et al.
5,235,503 A * 8/1993 Stemmler ............ H02M 5/4505
                                                    363/37

(Continued)

FOREIGN PATENT DOCUMENTS

CN       206402112        8/2017
DE       19819869 C2      6/2001

(Continued)

OTHER PUBLICATIONS

European Search Report for Application No. 18204903.1; dated Mar. 19, 2019; 8 pages.

(Continued)

*Primary Examiner* — Emily P Pham
(74) *Attorney, Agent, or Firm* — Cantor Colburn LLP

(57) ABSTRACT

A pulse width modulation (PWM) based active harmonic filter (AHF) system including a controller configured to adjust a load on the system from a first to a second load, the first load being greater than the second load, wherein the controller is configured to adjust a frequency of the system from a first to a second frequency when the load is equal to the second load, and wherein the second frequency is greater than the first; a first harmonic compensator configured to filter a first order of harmonics of a load when the load is equal to the second load; and a second harmonic compensator configured to filter a second order of harmonics of the load in parallel with the first order of harmonics when the load is equal to the second load and frequency equals the second frequency, the second order of harmonics being greater than the first order.

6 Claims, 4 Drawing Sheets

(56) References Cited

U.S. PATENT DOCUMENTS

Figure 1:
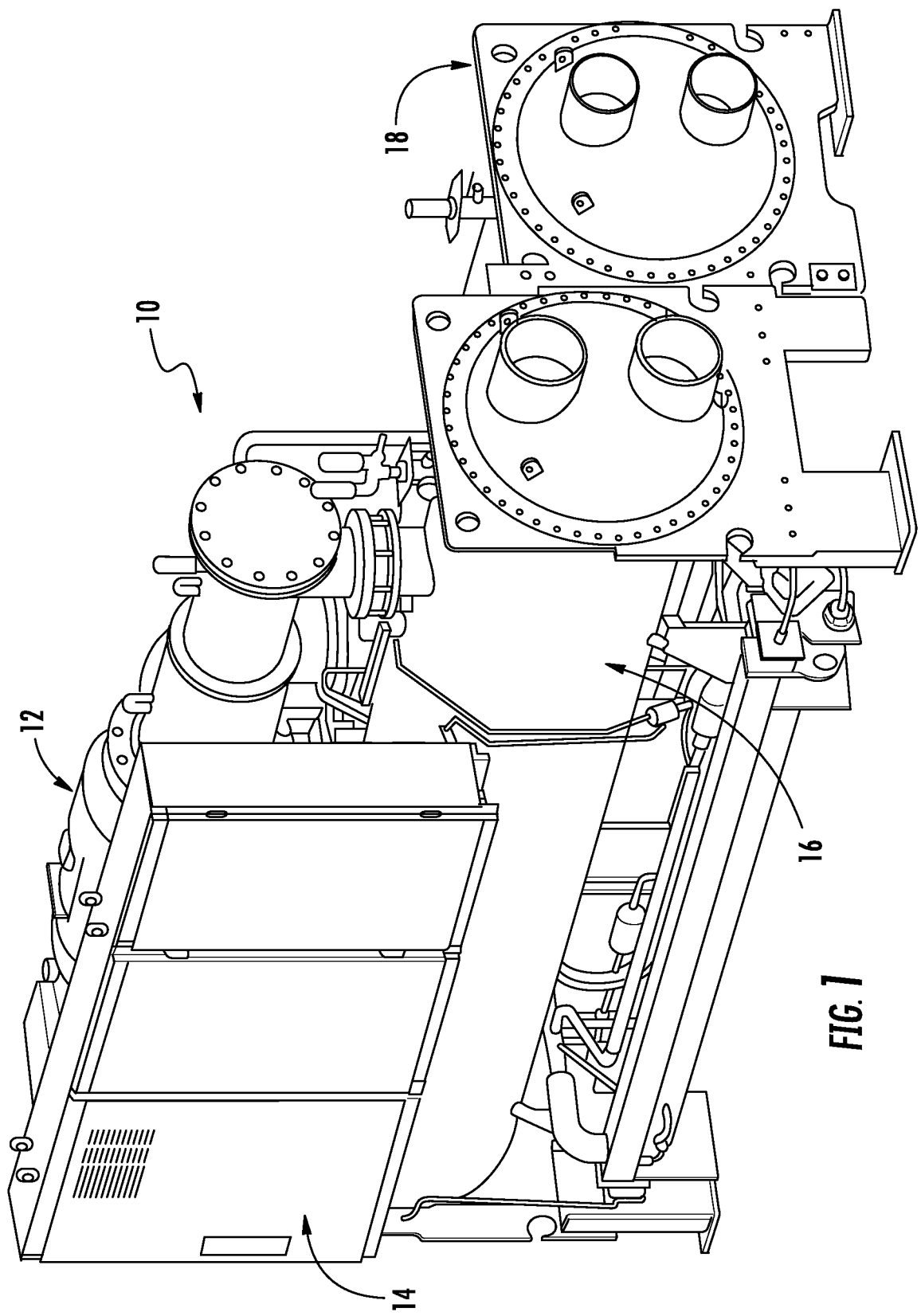

| | | | |
|---|---|---|---|
| 5,513,090 A * | 4/1996 | Bhattacharya | H02J 3/01 |
| | | | 307/105 |
| 5,731,965 A | 3/1998 | Cheng et al. | |
| 5,977,660 A | 11/1999 | Mandalakas et al. | |
| 6,091,940 A * | 7/2000 | Sorrells | H03C 1/62 |
| | | | 455/118 |
| 6,717,465 B2 * | 4/2004 | Chou | H02J 3/01 |
| | | | 330/149 |
| 6,965,290 B2 | 11/2005 | Gokhale et al. | |
| 8,476,873 B2 | 7/2013 | Green | |
| 8,941,365 B2 | 1/2015 | Murdock et al. | |
| 8,994,346 B2 | 3/2015 | Rahardjo et al. | |
| 9,146,045 B2 | 9/2015 | Miglio | |
| 9,240,749 B2 | 1/2016 | Green et al. | |
| 9,887,616 B2 * | 2/2018 | Bai | H02M 3/33507 |
| 2014/0096547 A1 | 4/2014 | Boehde | |
| 2016/0105095 A1 | 4/2016 | Mayell et al. | |
| 2017/0005565 A1 | 1/2017 | Bai et al. | |

FOREIGN PATENT DOCUMENTS

| | | |
|---|---|---|
| JP | 201711778 A | 1/2017 |
| WO | 2011124223 A2 | 10/2011 |

OTHER PUBLICATIONS

Wang et al. "An adaptive hysteresis band controller for LC-coupling hybrid active power filter with approximate contrant switching frequency." 2014 IEEE PES Asia-Pacific Power and Energy Engineering Conference (APPEEC), IEEE, Dec. 7, 2014, pp. 1-6.

HVAC Building Services Energy Efficient Fan & Pump Control; Eco Optidrive™; http://www.invertekdrives.com/client-uploads/download-manager/brochures/85-ECOBD-; 2017; 1-12 pages.

* cited by examiner

PULSE WIDTH MODULATION UPSHIFT AT PARTIAL LOAD TO IMPROVE TOTAL HARMONIC CANCELLATION PERFORMANCE FOR CHILLER APPLICATIONS

CROSS-REFERENCE TO RELATED APPLICATIONS

The present application is a non-provisional application of U.S. Provisional Application No. 62/583,213 filed Nov. 8, 2017. This application claims the benefit of U.S. Provisional Application No. 62/583,213 filed Nov. 8, 2017, which is incorporated herein by reference in its entirety.

BACKGROUND

The subject matter disclosed herein generally relates to chillers, and more particularly, to a method and apparatus to control harmonics of variable frequency drives of chillers.

An active harmonic filter (AHF) is an analog or digital device that is installed on a coupling point to a line in parallel with a rectifier front end type variable frequency drive and is configured to measure power quality on the grid or the rectifier side and to inject current from the coupling point to the electrical grid accordingly. That is, the AHF injects the current into the line in order to compensate for any unwanted deviations from the standard current (i.e., 50 or 60 Hz supply) as found from the measurements. Such deviations can be partially mitigated or mitigated in full.

In some cases, such as those where the load includes a rectifier front end type variable frequency drive in high tier chiller applications, the deviations may be present in the form of current harmonics. Here, when an active harmonic filter (AHF) is used to reduce current harmonics on the AC grid side connected in parallel with rectifier front end type variable frequency drives for high-tier chiller applications, it normally achieves best total harmonic cancellation (THD) performance at full load conditions. The THD level will increase at partial load conditions due to higher current distortion ratio at partial load conditions

BRIEF SUMMARY

According to one embodiment, a pulse width modulation (PWM) based active harmonic filter (AHF) system is provided. The PWM AHF system includes a controller configured to adjust a load on the PWM based AHF system from a first load to a second load, the first load being greater than the second load, wherein the controller is configured to adjust a frequency of the PWM based AHF system from a first frequency to a second frequency when the load is equal to the second load, and wherein the second frequency is greater than the first frequency; a first harmonic compensator configured to filter a first order of harmonics of a load when the load is equal to the second load; and a second harmonic compensator configured to filter a second order of harmonics of the load in parallel with the first order of harmonics when the load is equal to the second load and the frequency is equal to the second frequency, the second order of harmonics being greater than the first order of harmonics.

In addition to one or more of the features described above, or as an alternative, further embodiments may include that the load includes a rectifier front end type variable frequency drive in a high tier chiller.

According to another embodiment, a method of operating a pulse width modulation (PWM) based active harmonic filter (AHF) system is provided. The method including: adjusting a load on a PWM based AHF system from a first load to a second load, the first load being greater than the second load; filtering a first order of harmonics of a load when the load is equal to the second load; adjusting a frequency of the PWM based AHF system from a first frequency to a second frequency when the load is equal to the second load, wherein the second frequency is greater than the first frequency; and filtering a second order of harmonics of the load in parallel with the first order of harmonics when the frequency is equal to the second frequency, the second order of harmonics being greater than the first order of harmonics.

In addition to one or more of the features described above, or as an alternative, further embodiments may include that the load includes a rectifier front end type variable frequency drive in a high tier chiller.

According to another embodiment, a pulse width modulation (PWM) based active harmonic filter (AHF) system is provided. The PWM AHF system includes an input line by which upstream current is carried from a grid; an output line by which downstream current is carried toward a load; a controller configured to adjust a load on the PWM based AHF system from a first load to a second load, the first load being greater than the second load, wherein the controller is configured to adjust a frequency of the PWM based AHF system from a first frequency to a second frequency when the load is equal to the second load, and wherein the second frequency is greater than the first frequency; a first harmonic compensator configured to filter a first order of harmonics of a load when the load is equal to the second load; and a second harmonic compensator configured to filter a second order of harmonics of the load in parallel with the first order of harmonics when the load is equal to the second load and the frequency is equal to the second frequency, the second order of harmonics being greater than the first order of harmonics.

In addition to one or more of the features described above, or as an alternative, further embodiments may include that the grid includes an electrical grid and the load comprises a rectifier front end type variable frequency drive in a high tier chiller.

Technical effects of embodiments of the present disclosure include achieving a reduction of higher harmonics utilizing harmonic compensators and increasing frequency of pulse width modulation while decreasing load.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

Figure 2:
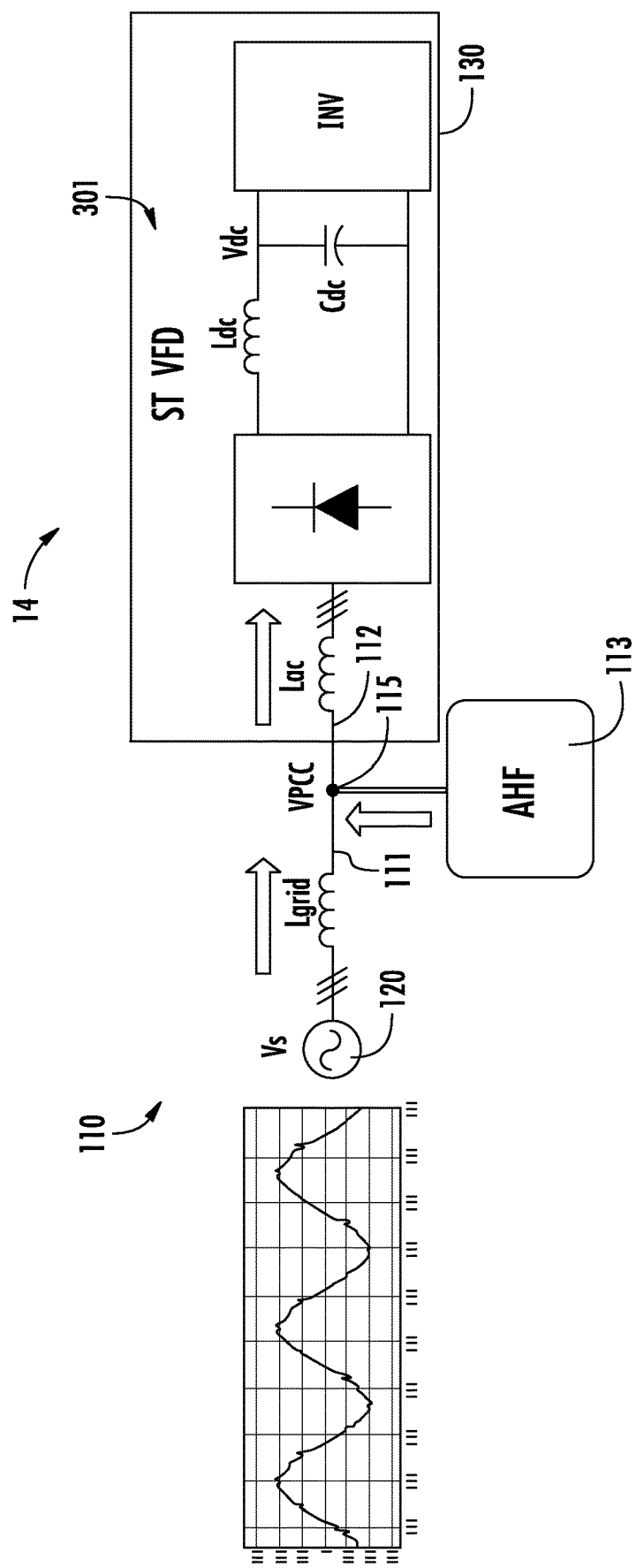
Figure 3:
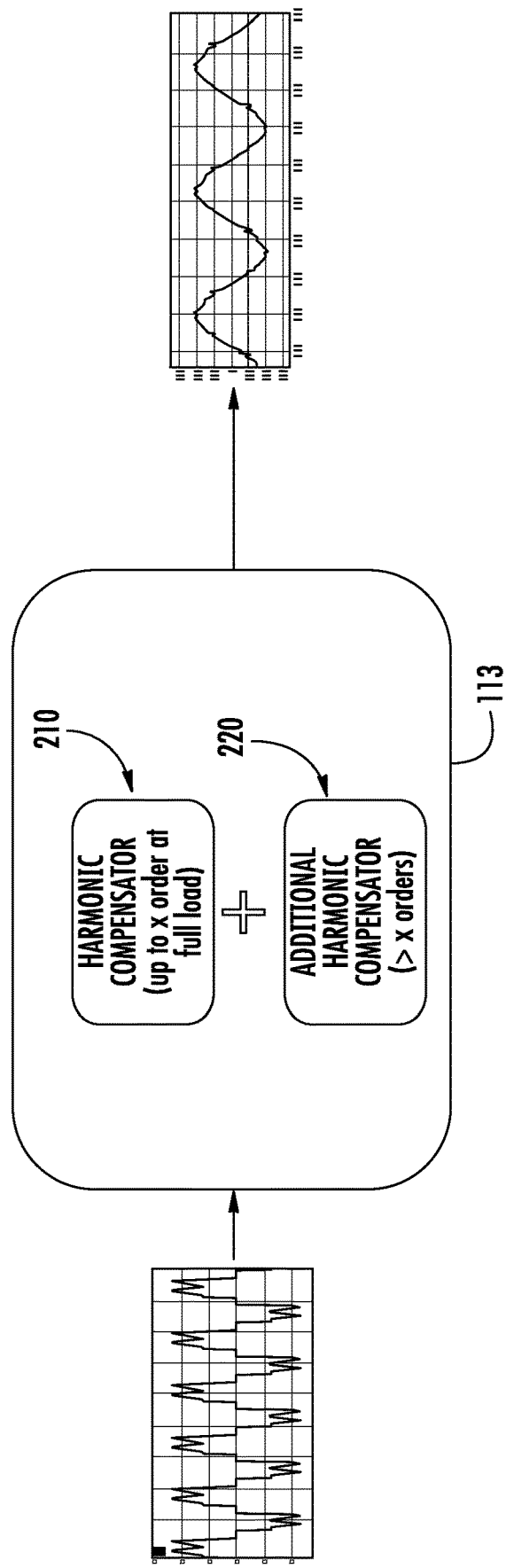
Figure 4:
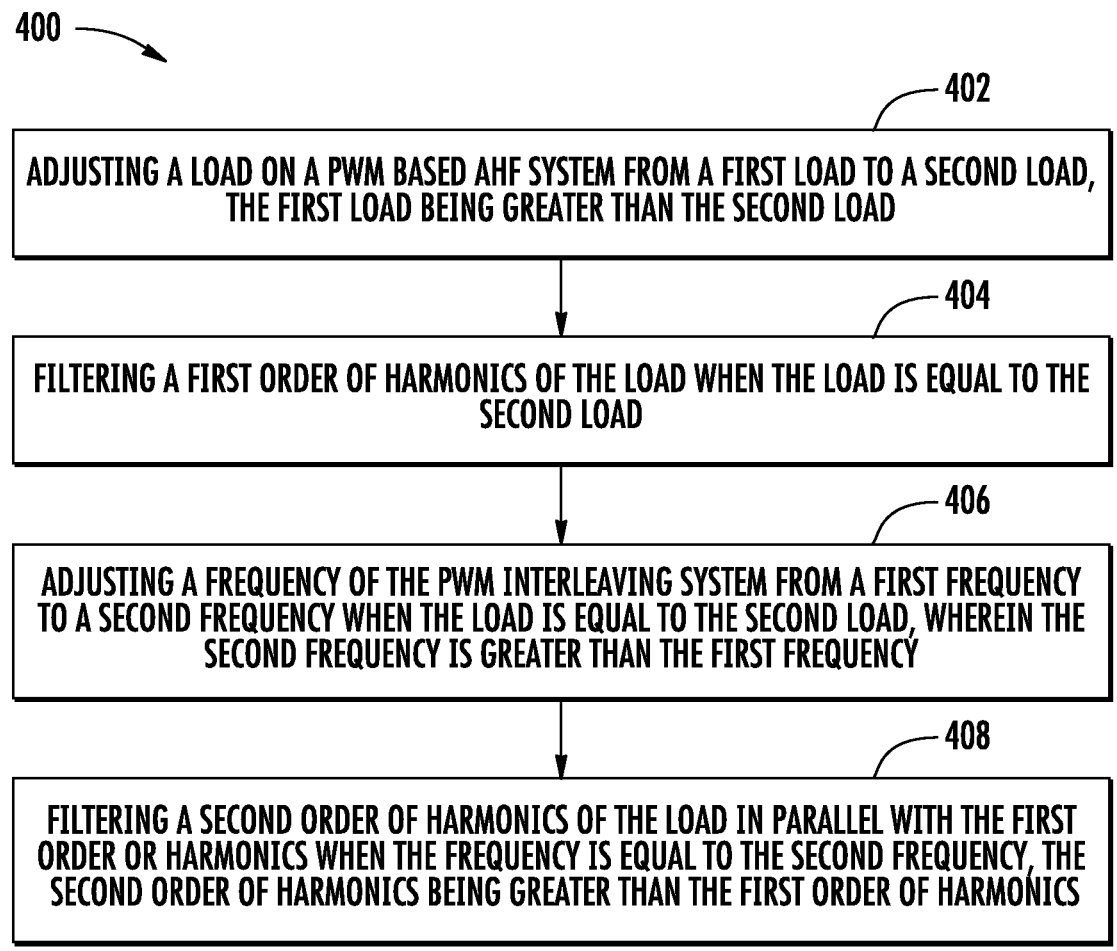

The following descriptions should not be considered limiting in any way. With reference to the accompanying drawings, like elements are numbered alike:

FIG. 1 schematically illustrates an isometric view of a chiller, in accordance with an embodiment of the disclosure;

FIG. 2 schematically illustrates a schematic illustration of a pulse width modulation (PWM) based active harmonic filter (AHF) system, in accordance with an embodiment of the disclosure;

FIG. 3 schematically illustrates a software schematic illustration of an active harmonic filters (AHF) shown with the addition of one or more harmonic compensators, in accordance with an embodiment of the disclosure; and FIG. 4 illustrates a flow diagram illustrating a method of operating a PWM based active harmonic filter (AHF) system, according to an embodiment of the present disclosure.

DETAILED DESCRIPTION

A detailed description of one or more embodiments of the disclosed apparatus and method are presented herein by way of exemplification and not limitation with reference to the Figures.

FIG. 1 depicts a chiller system 10 in an exemplary embodiment. Chiller system 10 is a screw chiller, but embodiments of the invention are appropriate for use with other compression chiller assemblies, such as, for example, a centrifugal chiller. As shown in FIG. 1, chiller system 10 includes compressor 12, variable frequency drive 14, condenser 16, and cooler 18.

In operation, gaseous refrigerant is induced into compressor 12 and compressed. Compressor 12 is driven by a motor under the control of variable frequency drive 14. Variable frequency drive 14 controls the frequency of the alternating current (AC) supplied to the motor thereby controlling the speed of the motor and the output of compressor 12. After the refrigerant is compressed, the high temperature, high pressure refrigerant gas is supplied to condenser 16. In condenser 16, the gaseous refrigerant condenses into liquid as it gives up heat. The condensed liquid refrigerant then flows into cooler 18, which circulates chilled water. The low pressure environment in cooler 18 causes the refrigerant to change states to a gas and, as it does so, it absorbs the required heat of vaporization from the chilled water, thus reducing the temperature of the water. The low pressure vapor is then drawn into the inlet of compressor 12 and the cycle is continually repeated. The chilled water is circulated through a distribution system to cooling coils for, for example, comfort air conditioning to cool an inside location separated from an outside location.

Portions of the chiller system 10 (e.g., cooler 18) may operate at a low pressure (e.g., less than atmosphere) which can cause non-condensables (e.g., ambient air) to be drawn into the chiller system 10. The non-condensables in the refrigerant flow of the chiller system 10 degrades performance of the chiller.

As will be described below, a system is provided which increases the pulse width modulation (PWM) switching frequency at partial load and also adds a higher order harmonic regulator with the higher PWM switching frequency. At full load, due to thermal limitation, active harmonic filters (AHFs) can only run at lower PWM switching frequency. A lower switching frequency will also not have enough control bandwidth to cancel higher order harmonics elements. Advantageously, at partial load, the AHF total current is also reduced with the reduced load, thus allowing a controller to increase the switching frequency without thermal issues and also add the higher order harmonic regulator which can cancel more high order harmonics elements and improve the overall total harmonic cancellation (THD) performance.

With reference to FIG. 2, a variable frequency drive 14 is shown. A pulse width modulations (PWM) based active harmonic filter (AHF) system 110 is provided and includes an input line 111, an output line 112, an active harmonic filter (AHF) 113, a controller 115, an electrical grid 120, a load 130, such as a rectifier front end type variable frequency drive 301 in a high tier chiller 10 (see FIG. 1). Upstream current is carried from the electrical grid 120, along the input line 111 to the AHF 113 and to the load 130 as downstream current along the output line 112.

The AHF 113 may be, but is not required to be, configured to measure a characteristic of the upstream current carried by and along the input line 111, such as a deviation from a standard frequency, and to execute PWM based on results of that measurement to thereby affect the characteristic of the downstream current on the output line 112. In so doing, the AHF 113 may tend to generate and develop ripple effects in the upstream current which may propagate undesirably towards the electrical grid 120. As such, the controller 115 is operably coupled to the AHF 113 and is configured to control the PWM of the AHF 113.

Referring to FIG. 3 with continued reference to FIGS. 1 and 2, a software schematic of the AHF 113 is shown with the addition of one or more harmonic compensators 210, 220. The harmonic compensators 210, 220 may include a first harmonic compensator 210 and a second order harmonic compensator 220. The second order harmonic compensator 220 may be utilized in addition to the first order harmonic compensator 210 at partial load. When both the first harmonic compensator 210 and the second order harmonic compensator 220 are in operation, an original harmonic order will be compensated by the first harmonic compensator 210, while the second order harmonic compensator 220 may compensate, in parallel, an additional harmonic of a higher order than the original harmonic. The controller 115 is configured to adjust a load on the PWM based AHF system 110 from a first load to a second load based on an inside temperature of an inside location, an outside temperature of an outside location separated from the inside location, and cooling requests from thermostats. The cooling requests may instruct the controller 115 to cool the inside location relative to the outside location, such that the inside temperature is lower than the outside temperature. The first load is greater than the second load. In an embodiment the second load is a partial load. The controller 115 is configured to adjust a frequency of the PWM based AHF system 110 from a first frequency to a second frequency when the load is equal to the second load. The second frequency is greater than the first frequency. The first harmonic compensator 210 is configured to filter a first order of harmonics of a load when the load is equal to the second load. The second harmonic compensator 220 is configured to filter a second order of harmonics of the load in parallel when the load is equal to the second load and the frequency is equal to the second frequency. The second order of harmonics is greater than the first order of harmonics in frequency. Advantageously, by the controller 115 reducing the load from the first load to the second load and increasing the frequency from the first frequency to the second frequency allows for allows for additional harmonics to be filtered out by the second harmonic compensator 220.

Referring now to FIG. 4, with continued reference to FIGS. 1-3. FIG. 4 shows a flow chart of method 400 of operating a PWM based active harmonic filter (AHF) system 110, in accordance with an embodiment of the present disclosure. At block 402, a load on a PWM based AHF system 110 is adjusted from a first load to a second load. The first load is greater than the second load. At block 404, a first order of harmonics of a load is filtered when the load is equal to the second load. At block 406, a frequency of the PWM based AHF system 110 is adjusted from a first frequency to a second frequency when the load is equal to the second load. The second frequency is greater than the first frequency. At block 408, a second order of harmonics of the load is filtered when the frequency is equal to the second frequency. The second order of harmonics is greater than the first order of harmonics.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pulse width modulation (PWM) based active harmonic filter (AHF) system, comprising:
    a controller configured to adjust a load on the PWM based AHF system from a first load to a second load, the first load being greater than the second load, wherein the controller is configured to adjust a frequency of the PWM based AHF system from a first frequency to a second frequency when the load is equal to the second load, and wherein the second frequency is greater than the first frequency;
    a first harmonic compensator configured to filter a first order of harmonics of the load when the load is equal to the second load; and
    a second harmonic compensator configured to filter a second order of harmonics of the load in parallel with the first order of harmonics when the load is equal to the second load and the frequency is equal to the second frequency, the second order of harmonics being greater than the first order of harmonics.

2. The PWM based AHF system according to claim 1, wherein the load comprises a rectifier front end type variable frequency drive in a high tier chiller.

3. A method of operating a pulse width modulation (PWM) based active harmonic filter (AHF) system, the method comprising:
    adjusting a load on a PWM based AHF system from a first load to a second load, the first load being greater than the second load;
    filtering a first order of harmonics of the load when the load is equal to the second load;
    adjusting a frequency of the PWM based AHF system from a first frequency to a second frequency when the load is equal to the second load, wherein the second frequency is greater than the first frequency; and
    filtering a second order of harmonics of the load in parallel with the first order of harmonics when the frequency is equal to the second frequency, the second order of harmonics being greater than the first order of harmonics.

4. The method according to claim 3, wherein the load comprises a rectifier front end type variable frequency drive in a high tier chiller.

5. A pulse width modulation (PWM) based active harmonic filter (AHF) system, comprising:
    an input line by which upstream current is carried from a grid;
    an output line by which downstream current is carried toward a load;
    a controller configured to adjust the load on the PWM based AHF system from a first load to a second load, the first load being greater than the second load, wherein the controller is configured to adjust a frequency of the PWM based AHF system from a first frequency to a second frequency when the load is equal to the second load, and wherein the second frequency is greater than the first frequency;
    a first harmonic compensator configured to filter a first order of harmonics of the load when the load is equal to the second load; and
    a second harmonic compensator configured to filter a second order of harmonics of the load in parallel with the first order of harmonics when the load is equal to the second load and the frequency is equal to the second frequency, the second order of harmonics being greater than the first order of harmonics.

6. The PWM based AHF system according to claim 5, wherein the grid comprises an electrical grid and the load comprises a rectifier front end type variable frequency drive in a high tier chiller.

* * * * *